Patented Feb. 16, 1943

2,310,969

UNITED STATES PATENT OFFICE 2,310,969

PROCESS FOR THE MANUFACTURE OF SHAPED STRUCTURES FROM SOLUTIONS OF CELLULOSE DERIVATIVES

Leon Lilienfeld, deceased, late of Vienna, Germany, by Emerich Hunna, executor, Vienna, Germany; Antonie Lilienfeld, administratrix of said Leon Lilienfeld, deceased, assignor to Lilienfeld Patents Inc., Boston, Mass., a corporation of Massachusetts No Drawing. Application May 13, 1940, Serial No. 334,991. In Germany May 23, 1939

6 Claims. (Cl. 18—54)

The manufacture of shaped materials from cellulose ether xanthates, the solutions of which contain at least 5% caustic soda or more, for example 7 to 9% caustic soda, is known, e. g. British Patent 357,527 and U. S. Patents 2,021,861, 2,100,010, 2,051,051, etc. Lilienfeld.

As the result of further investigation and research, leading up to the present invention, it is found to be possible to produce solutions of xanthates of simple or mixed alkyl-, or hydroxy-alkyl, or hydroxy-fatty acid-ethers of cellulose, which are obtained by the action of one or more etherifying agents on cellulose in the presence of caustic alkali and subsequent treatment with carbon disulphide. The caustic soda content of these solutions is best not over 4%, and can advantageously be for example 3% or 2% caustic soda. The production of these technically valuable solutions of cellulose ether xanthates is accomplished by dissolving the cellulose ether xanthate in water to the desired concentration, utilising the caustic soda content contained therein and thereby obtaining solutions of cellulose ether xanthates, the sodium hydroxide content of which amounts to less than 5%, with advantage to 4, or 3 or 2% depending on the mercerising lye employed for the production of the alkali cellulose and the extent to which the latter is pressed.

A further advantage of the present invention lies in the fact that cellulose ether xanthate solutions prepared in accordance with the invention, in consequence of their low caustic soda content, can be coagulated by means of one or more acid precipitating baths in which the acid content is far below that heretofore usually employed, rendering possible a considerable economy in acid. The resulting shaped materials such as artificial threads, films, coatings and layers of all kinds and the like are distinguished by outstanding properties.

Finally, the present invention also possesses the advantage that the alkaline coagulating baths described in the British Specifications Nos. 472,933 and 490,510 (i. e. alkali carbonate solution), can be employed for the coagulation of cellulose ether xanthate solutions produced in accordance with the present invention. In this connection it must be emphasized that the present invention constitutes a considerable advance over the older processes, because in consequence of the low caustic soda content of the cellulose ether xanthate solutions, even in cases in which amounts of carbon disulphide of 30–40% $CS_2$ were employed for the manufacture of the cellulose ether xanthates, when using alkaline coagulating baths it becomes unnecessary to prolong the ripening period which is absolutely necessary for the coagulation of cellulose ether xanthate solutions prepared by means of 30–40% $CS_2$ with normal caustic soda content.

The above-mentioned advantages of the present invention are of great importance technically in the manufacture of shaped structures from cellulose ether xanthate solutions because by means of the present invention it is possible to obtain with considerable reduction in the cost of manufacture shaped structures which must be recognized as of outstanding merit on account of their dynamometric and other properties.

The present invention can consequently be looked upon as the solution of the three following problems:

I. Economy of caustic soda in the manufacture of cellulose ether xanthate solutions.

II. Economy of acid when using acid precipitating baths.

III. The possibility of coagulating cellulose ether xanthate solutions produced by means of amounts of carbon disulphide in excess of 20% $CS_2$ without previously undergoing a long ripening period, such coagulation being by means of alkaline coagulating baths, e. g. sodium monocarbonate or bicarbonate solutions.

In the present invention the process may start from cellulose ethers or from cellulose ether xanthates prepared in accordance with any desired process or method, for example in accordance with any of the processes set out in Lilienfeld U. S. Patents Nos. 1,589,606, 1,682,292, 1,682,294, 1,722,927 or in Lilienfeld British Patents 374,964, 459,123, 459,124, 462,283, 462,456, 462,712, 469,007, 474,223, 491,488 and 503,830.

The cellulose ethers or cellulose ether xanthates which can be successfully employed in the present invention can also be produced in accordance with any other desired process or method which is suitable for the manufacture of those cellulose ethers which will dissolve completely or almost completely in caustic alkali lye at room temperatures, or which do not dissolve or are almost insoluble in caustic alkali lye at room temperature but can be wholly or largely dissolved therein at room temperature by cooling suspensions or incomplete solutions of the same in caustic alkali lye to a temperature between room temperature and 0° C., or to 0° C., or to a temperature below 0° C., for example, to —5° C., or to —10° C., or to a still lower temperature, and then allowing the temperature to rise to 0° C., or to over 0° C., for example, to room temperature.

In other words: In the present invention not only can those alkali-soluble cellulose ethers be employed which are obtainable in accordance with the processes described in the previously mentioned patents but also those cellulose ethers obtainable in accordance with any process which is suitable for the manufacture of cellulose ethers which are at least partially alkali-soluble or which can be rendered at least partially alkali-soluble by the application of lower temperatures (for example, in accordance with the process described in British Specification No. 212,864).

It should also be mentioned that in the present invention either simple or mixed cellulose ethers can be employed. As examples of mixed ethers the following may be given:

Cellulose derivatives containing two different alkyl groups in the molecule,
Cellulose derivatives containing two different hydroxy-alkyl groups in the molecule,
Cellulose derivatives containing one alkyl group and one hydroxy-alkyl group in the molecule,
Cellulose derivatives containing two different hydroxy-acid residues in the molecule,
Cellulose derivatives containing one alkyl group and one hydroxy-acid residue in the molecule,
Cellulose derivatives containing one hydroxy-alkyl group and one hydroxy-acid residue in the molecule,
and so on.

A practical method of forming the xanthate solution will now be given. The caustic soda solution used in mercerizing the alkali cellulose may be of low strength or the alkali cellulose may be pressed to leave only a little caustic alkali solution therein. This is then etherified and the product of the etherification step is xanthated, using any appropriate amount, such as 20%, 30%, or 40% $CS_2$, thereby leaving only a little caustic soda in the xanthated product. This is then dissolved in water, together with a small additional quantity of caustic soda if needed, and this dissolving may be done at 15° C., or at a lower temperature, say 0° C. to —5° C.

The solutions of cellulose ether xanthates can then be worked up to give shaped structures such as artificial threads, artificial hair, artificial straw, films, ribbons, strips, coatings, layers and impregnating agents of all kinds, finishing agents for fabrics, textile printing, bookbinders linen and tracing cloth, dressing for yarns, finishing agents and coatings for paper and the like, either by using acid precipitating baths in which the acid content is greatly reduced, for example, a precipitating bath containing for example 2% sulphuric acid or the equivalent amount of another mineral acid or in accordance with the two bath method in which, as the first bath, a solution of ammonium sulphate or another salt known from the viscose technique is used, and as the second bath, any acid precipitating bath known from the viscose technique in which the acid content is for example reduced to 2% sulphuric acid or by employing alkaline coagulation baths such, for example, as sodium mono-carbonate or bicarbonate solutions, which are described in British Patent 472,888 and U. S. Patent 2,224,874.

If desired or advantageous after coagulation in an alkaline bath the freshly precipitated material is treated in an acid bath. The solutions of cellulose ether xanthate may also be coagulated by means of water alone or by means of water containing precipitating agents in such extremely low concentrations that the solutions could not serve for the coagulation of normal viscose. Such a coagulation is shown in U. S. Patent 2,231,927.

Suitable softening agents, for example glycerine, or a glycol, or a sugar, for example glucose, or a soap, or Turkey Red oil, or a drying or a non-drying oil, in short all substances known from the viscose technique as additions to viscose can also be incorporated with the cellulose ether xanthate solutions prior to their being worked up into shaped articles.

It should further be emphasized that the appropriate time at which workability in accordance with the invention becomes possible, that is to say coagulability of the cellulose ether xanthate solution and/or the washability of the freshly coagulated structure, can be reached not only by ageing at or below room temperature, but also by warming or heating the cellulose ether xanthate solutions. It has been repeatedly observed that warming or heating those solutions to, for example 40 or 50° C. and maintaining this temperature with kneading, stirring, or otherwise agitating for 15 minutes to one or two hours is sufficient to impart to the cellulose ether xanthate solution the requisite degree of ripening for being worked up into shaped materials in accordance with the particular method contemplated.

In cases where for one reason or another particular importance is laid on accelerating the attainment of the requisite ripeness of the cellulose ether xanthate solution this acceleration can be effected by the addition to the cellulose ether xanthate solution of one or more of the substances known as ripening accelerators in the viscose technique.

The following examples will illustrate the practical execution of the invention. It is to be understood, however, that it is not intended to limit the invention to these examples, nor to the exact proportions of ingredients, times, temperatures, sequence of the steps in the process and so on. The parts given are by weight.

EXAMPLE I A–E

A. 1,000 parts of air-dried cotton linters or wood cellulose are immersed in 10,000 to 20,000 parts of 18% caustic soda lye at 15 to 20° C. and the mixture allowed to stand at this temperature from 1 to 24 hours. The mass is then pressed to 2,000 parts and shredded at 10 to 20° C. for 3 hours in a shredding apparatus. The alkali cellulose contains about 13.5% caustic soda determinable by analysis. Then 40 to 200 parts of ethylene chlorohydrin, or 55 to 200 parts of glycerine alpha-monochlorohydrin, or 80 to 300 parts of dimethyl sulphate or diethyl sulphate or monochloroacetic acid (for example, in the form of a concentrated aqueous solution of its sodium salt), or 20 to 120 parts of ethylene oxide, or 30 to 150 parts of propylene oxide are added all at once or in portions and the mixture shredded for 3 hours at 18° to 21° C. The etherifying agent can also be incorporated, diluted by means of suitable solvents. After shredding, 200 to 400 parts of carbon disulphide are added and the reaction product kneaded, stirred and otherwise agitated for 3 hours to 10 hours at 18° to 21° C. The mass is then dissolved at room temperature or at a temperature lying below room temperature, for example at 0° to —5° C. in so much water that a solution results containing 8% cellulose derivative calculated on the original cellulose and 2 to 2.2% caustic soda.

After allowing the solution to ripen for 24 to 96 hours at 15° to 18° C., during which time it is filtered two or three times, it is worked up to shaped materials of different kinds or used for finishing, or coating, or impregnating, or printing fabrics, or sizing yarns; the manufacture of some shaped materials is described in the following examples, which are far from exhausting the field of application of the invention.

Artificial threads (1) The solution of cellulose ether xanthate is caused to be introduced through spinning nozzles into a known precipitating bath, for example 2 to 20% sulphuric acid, or a bath containing 2 to 16% sulphuric acid and 10 to 25% sodium sulphate, or a bath containing 10 to 16% sodium sulphate, 14 to 30% magnesium sulphate and 2 to 16% sulphuric acid.

The baths may contain an addition of an organic substance for example 5 to 10% glucose or glycerine, or also zinc sulphate (for example 1 to 2%).

The precipitating baths can be employed at room temperature or at a temperature lying above room temperature.

The resulting threads are finished in the customary manner.

The spinning process can be carried out with or without additional stretching.

The threads can be treated with hardening agents as for example formaldehyde or the like either in the course of their manufacture or in the finished condition.

Staple fibre is produced in the known manner.

(2) The process is carried out as in (1) with the difference that as the coagulating bath one of the alkaline baths described in U. S. application Ser. No. 365,393 and in U. S. Patent 2,224,874 is employed, e. g. a solution of sodium mono-carbonate of 5 to 36% strength, or sodium bicarbonate of 3 to 14% strength, to which neutral salts, glycerine, sugars, etc. can be added, and which solution can also contain xylan in solution.

The subsequent treatment, depending on the properties of the spun thread, can be effected in accordance with the disclosures of the last mentioned two applications.

(3) The process is carried out as in (1) or (2) but with the difference that the solution of the cellulose ether xanthate is precipitated by using the two bath process. As the second precipitating bath an acid bath mentioned under (1) or an alkaline bath mentioned under (2) can be used.

Films (1) The cellulose ether xanthate solution is shaped on a drum film casting machine and the shaped solution precipitated by means of the baths for artificial threads mentioned under (1); or when worked up according to the two bath process by means of the baths mentioned under (3).

The coagulated film is washed with water and dried.

The formation and/or drying of the film can be carried out without additional stretching or with more or less additional stretching.

A suitable softening agent can be used to increase flexibility.

Water-proofing and hardening agents can also be used.

Instead of on a drum the solution can be shaped on an endless band.

The film can also be produced by extruding the solution through a slit directly into the precipitating bath.

As coagulating baths alkaline precipitating baths can also be employed in this modification.

The subsequent treatment of the film can be effected in accordance with one of the methods described in U. S. Patent 2,224,874 or U. S. application 365,393.

Adhesives and cements

The cellulose ether xanthate solution is used for sticking together two or more layers of paper or pasteboard or cotton fabric whereupon the stuck-together materials as such or after intermediate drying, are introduced into one of the baths mentioned in the section "Artificial threads."

Thick plates

Thick plates can be produced by bringing concentrated cellulose ether xanthate solutions or pastes into the corresponding shape and after preliminary drying, if desired, treating with any of the baths or bath combinations mentioned in the section "Artificial threads."

Finishing and printing fabrics (1) A fabric, for example cotton fabric, is impregnated once or more by means of a suitable machine with the cellulose ether xanthate solution. A filling material and/or softening agent can be incorporated with the solution. The impregnated material is then directly or after previous drying and/or steaming treated with one of the coagulating baths mentioned in the section "Artificial threads," and then washed and dried.

(2) The process is carried out as in (1) but with the difference that the cellulose ether xanthate solution is mixed with a starch or dextrin solution or with another colloid known in the finishing technique.

(3) Method of working as in (1) or (2) but with the modification that precautions are taken to ensure that the regenerated cellulose deposited in or on the fibres of the fabric has incorporated gas bubbles or hollow spaces in the known manner.

(4) Method of working as in (1) to (3) but with the difference that before it is brought on to the fabric the cellulose ether xanthate solution is converted into a foam in accordance with the process of my U. S. specification No. 2,165,392.

Examples for the dressing of yarn follow from (1) to (4).

(5) The cellulose ether xanthate solution is mixed with a dyestuff or a pigment, for example with dye-lake or ochre or lampblack or zinc white or finely divided mica, and a fabric printed or stencilled therewith. After printing or stencilling the fabric, if desired after drying, is introduced into one of the baths mentioned in (1).

B. Mode of execution as in Example A but with the difference that the reaction of the alkali cellulose with the etherifying agent or agents is effected at 5° to 10° C.

C. Mode of execution as in Example A but with the difference that the reaction of the alkali cellulose with the etherifying agent or agents is effected at 50° C.

D. Working process as in any of the Examples A to C but with the difference that the alkali cellulose is allowed to ripen for 12 to 96 hours or longer at 10° to 25° C.

E. Working process as in any of the Examples A to D but with the difference that after the 3 hours' stirring, kneading, or shredding provided for in Example A the reaction mass is allowed to stand for 12 to 96 hours or longer at room temperature.

EXAMPLE II A-E

Process as in any one of the Examples I A-E, but with the difference that the alkali cellulose is pressed to 2,500 parts instead of 2,000 parts. The resulting xanthate solution contains 8% cellulose derivative calculated on the original cellulose and 2.8 to 3% caustic soda.

EXAMPLE III A-E

Process as in any one of the Examples I A-E, but with the difference that the alkali cellulose is pressed to 3000 parts instead of 2,000 parts and the xanthate is dissolved in so much water that the solution contains 9% cellulose derivative calculated on the original cellulose and 3.6 to 4% caustic soda.

EXAMPLE IV A-E

Process as in any one of the Examples I A-E, but with the difference that for the manufacture of alkali cellulose 15% caustic soda lye is employed and the alkali cellulose is pressed to 2,200 parts.

EXAMPLE V A-E

Mode of execution of the process as in Example IV A-E but with the difference that the alkali cellulose is pressed to 2,800 parts instead of to 2,200 parts.

EXAMPLE VI A-E

Mode of execution of the process as in Example IV A-E, but with the difference that the alkali cellulose is pressed to 3,400 parts instead of to 2,200 parts.

EXAMPLE VII A-E

Mode of execution of the process as in Example I A-E, but with the difference that for the manufacture of the alkali cellulose 12% caustic soda lye is employed and the alkali cellulose is pressed to 2,500 parts.

EXAMPLE VIII A-E

Mode of execution of the process as in Example VII A-E, but with the difference that the alkali cellulose is pressed to 3,250 parts instead of to 2,500 parts.

EXAMPLE IX A-E

Mode of execution of the process as in Example VII A-E, but with the difference that the alkali cellulose is pressed to 4,000 parts instead of to 2,500 parts.

EXAMPLE X A-E

Mode of execution of the process as in Example I A-E, but with the difference that for the manufacture of the alkali cellulose 9% caustic soda lye is employed and the alkali cellulose is pressed to 3,000 parts.

EXAMPLE XI A-E

Mode of execution of the process as in Example X A-E, but with the difference that the alkali cellulose is pressed to 4,000 parts instead of to 3,000 parts.

EXAMPLE XII A-E

Mode of execution of the process as in Example X A-E, but with the difference that the alkali cellulose is pressed to 5,000 parts instead of to 3,000 parts.

EXAMPLE XIII A-E

Mode of execution of the process as in Examples I A-E to XII A to E, but with the difference that instead of the amounts of etherifying agent given in these examples 200 to 400 parts of ethylene chlorhydrin, or 200 to 600 parts of glycerine alpha-monochlorhydrin, or 300 to 500 parts of dimethyl sulphate, or diethyl sulphate, or monochloracetic acid (for example, in the form of a concentrated aqueous solution of its sodium salt), or 120 to 240 parts of ethylene oxide, or 150 to 300 parts of propylene oxide are employed in the manufacture of the cellulose ether.

It should further be mentioned that instead of the simple etherifying agents given hitherto, mixtures of two or more different etherifying agents can also be employed, the composition of which can be varied within wide limits.

EXAMPLE XIV A-H

A. 1,000 parts of air-dried cotton linters or wood pulp are immersed in 10,000 to 20,000 parts of 18% caustic soda lye at 15° C. to 20° C. and the mixture allowed to stand at 15° to 20° C. for one to 24 hours.

The reaction mass is pressed to 2,000 parts and shredded at 10° to 18° C. for 2 to 3 hours in a suitable shredding apparatus, the shredded alkali cellulose is then transferred to a rotary autoclave, or to a stirring autoclave, 200 parts of pre-cooled ethyl chloride are added, the reaction mixture heated to 60° to 80° C. and maintained at this temperature for 12 to 24 hours.

The reaction product is xanthated in a manner similar to that described in any of the preceding examples and after xanthation is dissolved in such a manner that the solution contains 2 to 4% caustic soda.

B. Working process as in Example A but with the difference that instead of 200 parts of ethyl chloride, 300 to 1,000 parts of ethyl chloride are employed for the manufacture of the cellulose ether.

C. Working process as in Example A but with the difference that instead of 200 parts of ethyl chloride, 75 to 100 parts of ethyl chloride are employed for the manufacture of the cellulose ether.

D. Working process as in Example A but with the difference that instead of 200 parts of ethyl chloride, a mixture of 50 parts of ethyl chloride and 50 to 200 parts of ethylene chlorhydrin, or 25 to 140 parts of ethylene oxide, or 100 to 200 parts of dimethyl sulphate, or 100 to 200 parts of methyl chloride, or 100 to 300 parts of benzyl chloride or monochloracetic acid (for example in the form of its sodium salt) are employed for the manufacture of the cellulose ether.

E. Working process as in any one of the Examples A-D but with the difference that the etherification is effected at 50° C.

F. Working process as in any one of the Examples A-E but with the difference that the etherification is effected at 95° C.

G. Mode of operation of the process in accordance with any of the Examples A-F but with the difference that the duration of the heating in the etherifying operation only amounts to 3 to 6 hours.

H. Working process as in any one of the Examples A-C but with the difference that the alkali cellulose is allowed to ripen for 12 to 96 hours or longer.

When no excess ethyl chloride over the amount calculated on the caustic soda contained in the alkali cellulose is employed, the etherification can be effected at a temperature exceeding 100° C. for example at 110° to 130° C. or higher.

EXAMPLE XV A-H

Mode of operation of the process in accordance with any one of the Examples XIV A-H, but with the difference that the alkali cellulose employed for the manufacture of the cellulose ether is pressed to 2,500 parts instead of to 2,000 parts.

EXAMPLE XVI A-H

Mode of operation of the process in accordance with any one of the Examples XIV A-H, but with the difference that the alkali cellulose employed for the manufacture of the cellulose ether is pressed to 3,000 parts instead of to 2,000 parts.

Instead of producing the alkali cellulose by immersing cellulose in an excess of alkali lye and removing the excess by pressing, it can also be produced in each of the preceding examples by mixing the cellulose in a mixing apparatus with that quantity of caustic soda solution corresponding with the quantity which would remain after pressing in the alkali cellulose employed in the respective examples. The mixing can be carried out at room temperature or above room temperature, for example at 24° to 30° C. or with cooling, for example at 15° C. to 10° C., or lower. The time of mixing can be varied within wide limits, for example from one to 24 hours or longer.

In the above examples that quantity of etherifying agent which remains in the reaction product after the etherifying operation can be recovered by suitable means such as condensation or distillation.

In the preceding examples instead of cellulose a conversion product of cellulose, which is insoluble or only scarcely soluble in caustic alkali solution can be employed as parent material, for example a cellulose hydrate or hydro-cellulose obtained by chemical action on cellulose, for example by mercerisation with subsequent washing and if desired drying, or by the effect of strong inorganic or organic acids, or a mixture of both, or by heating with a dilute mineral acid, or by treatment with a zinc halide, or by a mechanical process such as grinding in the presence of water or the like, or an oxycellulose, in short any substance of the cellulose group which has been proposed for the manufacture of viscose or any other cellulose derivative or cellulose compound or of copper oxide ammonia cellulose.

In the preceding examples a small amount of a catalyst (for example, metal salt such as copper, nickel, zinc, or iron salts or a peroxide such as, for example, benzoyl peroxide or ammonia or a primary, secondary or tertiary base such as mono-, or dialkyl aniline or a mono-, di-, or tri-alkylamine, or an aralkylamine, or an oxyalkylamine or the like), can be incorporated with the alkali cellulose or with the reaction mixture.

In the preceding examples, if desired or advantageous, instead of the alkylating or oxyalkylating agent, equivalent quantities of alkylating or oxy-alkylating agents containing other alkyl or oxyl-alkyl groups, for example, methyl chloride, or propyl chloride or an amyl chloride, or a butyl chloride or propylene chlorhydrin or butylene chlorhydrin and the like can be employed.

If desired or advantageous, instead of ethylene oxide or propylene oxide in the preceding examples, other alkylene oxides can be employed, for example butylene oxide, in short all suitable compounds containing an ethylene oxide ring.

If desired or feasible instead of the alkyl halides or di-alkyl sulphates in the preceding examples, equimolecular quantities of substitution or addition derivatives thereof can be employed, for example halogen alkyl amines such as halogen alkyl dialkylamines, or hydrochlorides thereof.

If desired or feasible instead of chloracetic acid in the respective preceding examples, the equimolecular quantity of an ester of chloracetic acid can be employed, for example methyl- or ethyl-chloracetate or a halogen derivative of the homologue of acetic acid, for example alpha-chloro-propionic acid or alpha-chloro-isobutyric acid, or alpha-bromo-propionic acid, or alpha-bromo-isobutyric acid, or the like, or alkali salts or esters thereof.

If feasible or advantageous in the preceding examples water can be used as the coagulating bath, as described in U. S. Patent 2,236,927 can be employed in working up products of the invention into shaped structures or other products.

As a guiding line with regard to the question of whether the alkali cellulose should be allowed to mature before being treated with the etherifying agent or agents should serve among others the desired viscosity of solutions of cellulose ether xanthate for working up into artificial structures in general and to artificial threads in particular and in relation therewith the viscosity of the type of cellulose in question.

The extensibility of the shaped materials such as threads or films or plates produced in accordance with the present invention can be increased by treatment either in the course of manufacture, for example, after coagulating and washing or in the finished wet or dry state by means of appropriate agents effecting shrinking, for example with one of the agents mentioned in my U. S. specifications Nos. 1,989,098, 1,989,100, 1,989,099, 1,989,101, 2,004,875, 2,004,876 and 2,004,877.

Desulphurising and/or bleaching of the artificial threads or films or plates can be carried out in accordance with any method known in the technique of cellulose xanthate solutions, for instance according to the methods described in U. S. Patent 2,224,874 and U. S. application 365,393.

In the description and in the claims, where the sense permits, the expressions "alkali-soluble cellulose ether," "cellulose ether which is wholly or at least partially soluble in caustic alkali lye" and "cellulose ether which is at least partially soluble in caustic alkali lye" are intended to embrace simple and mixed cellulose ethers which are completely or almost completely soluble in caustic alkali lye at room temperature or a lower temperature, for example at a temperature between room temperature and 0° C. or at 0° C., or at −2° to −3° C., and simple and mixed cellulose ethers which are insoluble or incompletely soluble in caustic alkali lye at room temperature but which can be rendered soluble or almost completely soluble therein at room temperature by cooling suspensions or incomplete solutions thereof to a temperature between room temperature and 0° C. or to a temperature below 0° C., for example to −5° C. or to −10° C. or lower and then allowing the temperature to rise to 0° C. or to over 0° C., for example, to a temperature lying between 0° C. and 20° C., and also simple and mixed cellulose ethers which are insoluble or incompletely soluble in alkali lye at room temperature or at a temperature between room temperature and 0° C. or even at 0° C., which however can be rendered partially or completely soluble therein at room temperature and/or at a temperature between room temperature and 0° C., or at 0° C. by cooling suspensions or incomplete solutions thereof to a temperature below 0° C., for example to —5° C. or —10° C. or lower and then allowing the temperature to rise to 0° C. or to over 0° C.

The methods of etherification as set forth in all of the above examples, give cellulose ethers of a low degree of etherification, that is to say, the cellulose ethers produced, when following the specific examples herein, contain, to each substituent alcohol radical, several $C_6H_{10}O_5$-molecular units of cellulose.

In the description and in the claims wherever the context permits "cellulose" is intended to embrace cellulose, conversion and oxidation products thereof, such as cellulose hydrate, hydrocellulose, oxycellulose, acid cellulose and the like, in short any body of the cellulose group which has been proposed as starting material for the production of cellulose derivatives or cellulose compounds of any kind.

Wherever the context permits the expression "alkali cellulose" has the usual significance, that is, alkali cellulose manufactured by steeping cellulose in caustic alkali lye and removing the excess of the latter by pressing, or alkali cellulose which is prepared by bringing cellulose together with the amount of caustic alkali solution required in the final alkali cellulose.

The expression "etherifying" or "etherification" in the description and in the claims is intended to embrace alkylation or aralkylation or oxyalkylation or the production of oxy-acid derivatives. "Ether" means simple alkyl- or aralkyl- and oxy-alkyl- or oxy-acid-ether, and also mixed ethers, for example the mixed ethers described in the second paragraph of page 2. "Etherifying agent" and "etherification agent" mean alkylating and aralkylating and oxyalkylating agents, and halogen fatty acids.

Wherever the context permits in the description and in the claims the expression "cellulose ether" is intended to embrace simple and mixed cellulose ethers of any kind, that is, cellulose compounds containing an alcohol radical combined in an ether-like manner with the cellulose molecule and the like without regard to whether the alcohol radical is unsubstituted or substituted by an organic group or an organic radical or by a suitable inorganic element such as nitrogen or sulphur or by a group containing an inorganic element (for example, a nitrogen-hydrogen group or a sulphur-hydrogen group), in short by any group or radical known as a substituent in alcohol radicals.

The expression "artificial threads" means artificial threads and spun materials of any kind, for example artificial silk, artificial cotton, artificial wool, staple fibre, artificial hair, and artificial straw of any kind.

The expression "films" means films, ribbons, and strips of any kind.

The expression "textile material" in the description and in the claims means wherever the context permits any spun or woven textile material of animal or vegetable origin (for example, flax, linen, hemp, ramie, jute, wool, and in particular cotton as well as artificial threads such as artificial silk and fabrics or yarns consisting of the same or containing the same), in the form of pure or mixed fabrics or in the form of spun material, such as skeins, kops, or warps.

What is claimed is:

1. Process for the production of shaped structures consisting of or containing cellulose derivatives comprising the production of a solution of cellulose ether xanthate containing not over 4% caustic soda and precipitating the cellulose derivative by coagulating the said solution by means of a bath containing an alkali carbonate as the coagulating agent, and which bath is free from ammonium salts of strong mineral acids.

2. Process for the production of shaped structures consisting of or containing cellulose derivatives comprising the production of a solution of cellulose ether xanthate containing not over 4% caustic soda and precipitating the cellulose derivative by coagulating the said solution first by means of an alkali carbonate solution which is free from ammonium salts of strong mineral acids and then treating the freshly coagulated material by means of an acid bath.

3. In the manufacture of regenerated shaped cellulosic products by the steps of xanthating cellulose ether, dissolving the cellulose ether xanthate in water and caustic alkali, giving to the cellulose ether xanthate solution the shape of the artificial structure desired and coagulating such shaped solution, the herein described improvement which consists in dissolving the cellulose ether xanthate in such amounts of water and caustic alkali as to give a xanthate solution containing an amount of caustic alkali which is not over 4%, figured as caustic soda.

4. A workable solution of a cellulose ether xanthate, which solution contains caustic alkali in an amount not over 4%, calculated as caustic soda.

5. A process as covered in claim 3 in which the dissolving of the cellulose ether xanthate is effected under refrigeration.

6. A process as covered in claim 3 in which the cellulose ether used is one that can itself remain dissolved in caustic alkali solution at room temperature after refrigeration of a mixture of said ether with caustic soda solution.

EMERICH HUNNA,
*Executor of the Last Will and Testament of Leon Lilienfeld, Deceased.*